(12) United States Patent
Kayama

(10) Patent No.: US 11,013,390 B2
(45) Date of Patent: May 25, 2021

(54) AUTONOMOUS TRAVELER

(71) Applicant: TOSHIBA LIFESTYLE PRODUCTS & SERVICES CORPORATION, Kawasaki (JP)

(72) Inventor: Toshihiro Kayama, Seto (JP)

(73) Assignee: TOSHIBA LIFESTYLE PRODUCTS & SERVICES CORPORATION, Kawasaki (JP)

(*) Notice: Subject to any disclaimer, the term of this patent is extended or adjusted under 35 U.S.C. 154(b) by 100 days.

(21) Appl. No.: 16/068,245

(22) PCT Filed: Dec. 14, 2016

(86) PCT No.: PCT/JP2016/087313
§ 371 (c)(1),
(2) Date: Jul. 5, 2018

(87) PCT Pub. No.: WO2017/119255
PCT Pub. Date: Jul. 13, 2017

(65) Prior Publication Data
US 2019/0008353 A1   Jan. 10, 2019

(30) Foreign Application Priority Data

Jan. 8, 2016   (JP) .............................. JP2016-002735

(51) Int. Cl.
*A47L 11/40*   (2006.01)
*G05D 1/02*   (2020.01)
(Continued)

(52) U.S. Cl.
CPC ............. *A47L 11/4061* (2013.01); *A47L 9/00* (2013.01); *A47L 9/28* (2013.01); *G05D 1/0088* (2013.01);
(Continued)

(58) Field of Classification Search
CPC .......... A47L 11/4061; A47L 9/00; A47L 9/28; A47L 2201/04; G05D 1/02; G05D 1/0088; G05D 1/0238; G05D 2201/0215
See application file for complete search history.

(56) References Cited

U.S. PATENT DOCUMENTS 4,674,048 A * 6/1987 Okumura ............... B25J 9/1676
  318/568.12
4,962,453 A * 10/1990 Pong, Jr. ............. A47L 11/4011
  180/167
(Continued)

FOREIGN PATENT DOCUMENTS

CN          1568156 A      1/2005
CN        101276223 A     10/2008
(Continued)

OTHER PUBLICATIONS

Step Back and Steer Recovery Document (Year: 2017).*
(Continued)

*Primary Examiner* — Jeff A Burke
*Assistant Examiner* — Kyle T Johnson
(74) *Attorney, Agent, or Firm* — Oblon, McClelland, Maier & Neustadt, L.L.P.

(57) ABSTRACT

Provided herein a vacuum cleaner capable of effectively escaping from a situation where driving wheels are in an idling state. The vacuum cleaner includes a main casing, driving wheels, a control unit and an idling detection part. The driving wheels enable the main casing to travel. The control unit controls the driving of the driving wheels to make the main casing autonomously travel. The idling detection part detects that the driving wheels are in an idling state. In the case where the idling detection part detects that the driving wheels are in an idling state, the control unit controls the operation of the driving wheels so as to, after the operation to make the main casing retreat by a certain
(Continued)

distance, repeat consecutively for a plurality of times the operation to make the main casing turn in a specified one direction and advance by a specified distance.

10 Claims, 7 Drawing Sheets

(51) Int. Cl.
  *A47L 9/00* (2006.01)
  *A47L 9/28* (2006.01)
  *G05D 1/00* (2006.01)

(52) U.S. Cl.
  CPC ............. *G05D 1/02* (2013.01); *G05D 1/0238* (2013.01); *A47L 2201/04* (2013.01); *G05D 2201/0215* (2013.01)

(56) References Cited

U.S. PATENT DOCUMENTS

| | | | | |
|---|---|---|---|---|
| 4,967,862 | A * | 11/1990 | Pong | A47L 5/362 |
| | | | | 180/19.3 |
| 5,012,886 | A * | 5/1991 | Jonas | A47L 9/0009 |
| | | | | 180/279 |
| 6,760,947 | B2 | 7/2004 | Stuchlik et al. | |
| 7,430,455 | B2 * | 9/2008 | Casey | G05D 1/0238 |
| | | | | 15/319 |
| 8,417,383 | B2 | 4/2013 | Ozick et al. | |
| 8,873,832 | B2 | 10/2014 | Shin et al. | |
| 2002/0091466 | A1 * | 7/2002 | Song | G05D 1/0246 |
| | | | | 700/245 |
| 2004/0207355 | A1 * | 10/2004 | Jones | G05D 1/0219 |
| | | | | 318/568.12 |
| 2007/0016328 | A1 * | 1/2007 | Ziegler | A47L 5/14 |
| | | | | 700/245 |
| 2008/0065265 | A1 * | 3/2008 | Ozick | G05D 1/0231 |
| | | | | 700/245 |
| 2008/0183349 | A1 * | 7/2008 | Abramson | G05D 1/0265 |
| | | | | 701/23 |
| 2012/0173070 | A1 | 7/2012 | Schnittman | |
| 2012/0219207 | A1 | 8/2012 | Shin et al. | |
| 2015/0197012 | A1 | 7/2015 | Schnittman et al. | |
| 2015/0233135 | A1 * | 8/2015 | Hui | E04H 4/1654 |
| | | | | 134/18 |
| 2016/0202703 | A1 | 7/2016 | Matsubara | |
| 2018/0049613 | A1 * | 2/2018 | Tsuboi | A47L 9/28 |
| 2018/0242808 | A1 * | 8/2018 | Jung | A47L 9/28 |
| 2019/0008353 | A1 * | 1/2019 | Kayama | G05D 1/02 |

FOREIGN PATENT DOCUMENTS

| | | |
|---|---|---|
| CN | 103284662 A | 9/2013 |
| CN | 103584798 A | 2/2014 |
| CN | 104040450 A | 9/2014 |
| CN | 104799767 A | 7/2015 |
| JP | H04-160507 A | 6/1992 |
| JP | H04-260905 A | 9/1992 |
| JP | 2007-11798 A | 1/2007 |
| JP | 2013-508183 A | 3/2013 |
| JP | 2015-52988 A | 3/2015 |
| JP | 2015-152944 A | 8/2015 |
| KR | 100767120 B1 | 10/2007 |
| TW | I279219 B | 4/2007 |
| TW | I440995 B | 6/2014 |
| WO | WO 03/024292 A2 | 3/2003 |

OTHER PUBLICATIONS

Step Back and Steer Recovery Document Dated (Year: 2017).*
Rotate Recovery Document (Year: 2014).*
Rotate Recovery Document Dated (Year: 2014).*
International Search Report dated Feb. 28, 2017 in PCT/JP2016/087313 filed Dec. 14, 2016.

* cited by examiner

AUTONOMOUS TRAVELER

CROSS REFERENCE TO RELATED APPLICATIONS

The present application is a National Stage Application of PCT/JP2016/087313 filed on Dec. 14, 2016. The PCT application acclaims priority to Japanese Patent Application No. 2016-002735 filed on Jan. 8, 2016. All of the above applications are herein incorporated by reference.

FIELD

Embodiments described herein relate generally to an autonomous traveler capable of autonomously traveling.

BACKGROUND

Conventionally, a so-called autonomous-traveling type vacuum cleaner (cleaning robot) which cleans a floor surface while autonomously traveling on a traveling surface such as a cleaning-object surface has been known.

Such a vacuum cleaner which includes a main casing, various types of sensors disposed in the main casing, and a driving wheel enabling the main casing to travel is travel-controlled so as to avoid an object (obstacle) in its periphery detected by any one of the sensors based on the driving of the driving wheel.

Now, a traveling distance of a vacuum cleaner is detected, for example, based on a rotational speed of the driving wheel. In a normal cleaning area or the like, after going straight by a certain distance, a vacuum cleaner surely approaches or collides with an obstacle or a wall or senses a step gap or a virtual wall signal, and thus has to implement directional change. Accordingly, in the case of detection of going straight by a specified distance or longer without any directional change, it is assumed that the vacuum cleaner does not travel actually due to getting stuck with a step gap on a traveling surface and that the driving wheel is in an idling state. Accordingly, a vacuum cleaner is expected to have a configuration to try to escape from the idling state.

As a method by which the driving wheel escapes from the idling state, a method for making the vacuum cleaner alternately repeat turning and going straight is considered to be taken. Especially, in the considered method, the vacuum cleaner is made to turn by a specified angle in one direction and go straight, and then made to turn by a specified angle in the opposite direction and go straight, and such a control is repeated for a plurality of times. However, since this method makes the vacuum cleaner turn alternately in opposite directions, the direction of advancing to, for example, an obstacle on a traveling surface is hardly changed largely. In the case where the vacuum cleaner cannot escape from the idling state for the first time, the vacuum cleaner has possibility of becoming in the idling state again.

CITATION LIST

Patent Literature

PTL 1: Japanese Laid-open Patent Publication No. 2015-152944

Technical Problem

The technical problem of the invention is to provide an autonomous traveler capable of effectively escaping from a situation where a driving wheel is in an idling state.

Solution to Problem

The autonomous traveler in the embodiment includes a main casing, a driving part, a control unit, and an idling detection part. The driving part enables the main casing to travel. The control unit controls the driving of the driving part to make the main casing autonomously travel. The idling detection part detects that the driving part is in an idling state. When the idling detection part detects that the driving part is in an idling state, the control unit controls the operation of the driving part so as to, after the operation to make the main casing retreat by a certain distance, repeat consecutively for a plurality of times the operation to make the main casing turn in a specified one direction and advance by a specified distance.

DESCRIPTION OF EMBODIMENTS

Hereinbelow, the configuration of the first embodiment will be described with reference to the accompanying drawings.

Figure 2A:
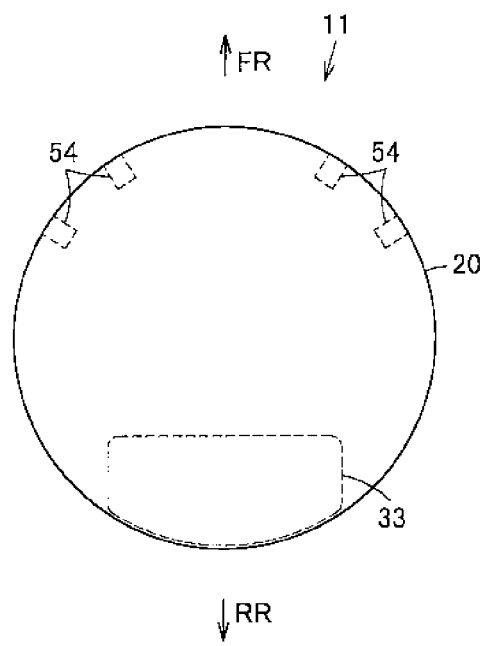
FIG. 2A is a top view of the above autonomous traveler.
Figure 2B:
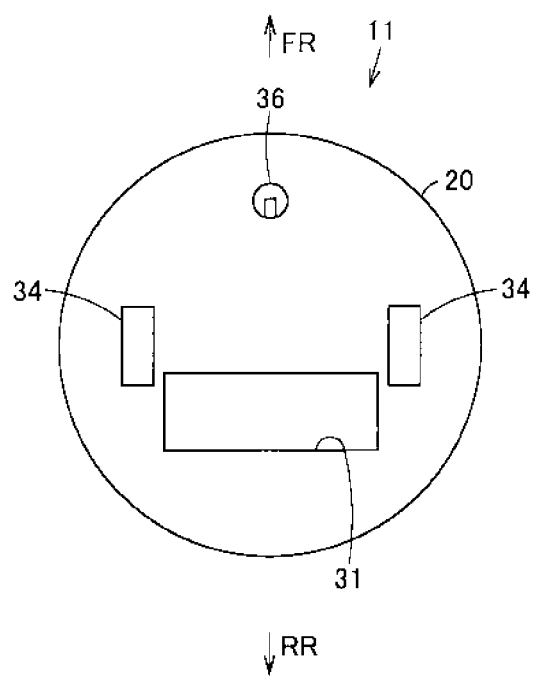
FIG. 2B is a bottom view of the above autonomous traveler.

In FIG. 2A and FIG. 2B, reference sign 11 denotes a vacuum cleaner as an autonomous traveler, and a vacuum cleaning apparatus (vacuum cleaning system) is configured with this vacuum cleaner 11 in combination with a charging device (charging table) not shown in figures as a station device serving as a base station for charging this vacuum cleaner 11. Then, the vacuum cleaner 11 is, in the embodiment, a so-called self-propelled robot cleaner (cleaning robot) which cleans a floor surface that is a cleaning-object surface as a traveling surface while autonomously traveling (self-propelled to travel) on the floor surface.

Furthermore, the vacuum cleaner 11 includes a hollow main casing 20. The vacuum cleaner 11 further includes a traveling part 21 shown in FIG. 1 which makes the main casing 20 travel on a floor surface. The vacuum cleaner 11 may also include a cleaning unit 22 for cleaning dust and dirt on a floor surface or the like. Further, the vacuum cleaner 11 may include a sensor part 24. The vacuum cleaner 11 also includes control means (a control unit) 27 which is a controller for controlling the traveling part 21, the cleaning unit 22, or the like. Further, the vacuum cleaner 11 may include a secondary battery 28 for supplying electric power to the traveling part 21, the cleaning unit 22, the sensor part 24, the control means 27 or the like. Further, the vacuum cleaner 11 may include a communication part for communicating with an external device including, for example, a charging device. In addition, the following description will be given on the assumption that a direction extending along a traveling direction of the vacuum cleaner 11 (main casing 20) is assumed as a back-and-forth direction (directions of arrows FR and RR shown in FIG. 2A and the like) while a left-and-right direction (directions toward both sides) intersecting (orthogonally crossing) the back-and-forth direction is assumed as a widthwise direction.

The main casing 20 shown in FIG. 2A and FIG. 2B is formed into a flat columnar shape (disc shape) or the like from a synthetic resin, for example. A suction port 31 serving as a dust collecting port, an exhaust port not shown in figures or the like are opened in the lower surface portion of the main casing 20, which faces the floor surface. Further, the main casing 20 includes a dust-collecting unit 33 which communicates with the suction port 31.

The traveling part 21 includes driving wheels 34, 34 as a plurality (pair) of driving parts, and each motor 35 (FIG. 1) each of which is driving means as an operating part for driving each driving wheel 34. The traveling part 21 may include a swing wheel 36 for turning.

Each driving wheel 34 makes the vacuum cleaner 11 (main casing 20) travel (autonomously travel) in an advancing direction and a retreating direction on the floor surface, that is, serves for traveling, and each driving wheel 34 having an unshown rotational axis extending along the left-and-right widthwise direction, are disposed symmetrically with each other in the widthwise direction. In addition, the outer circumferential part of the driving wheels 34 in contact with the floor surface which is formed from a soft member, for example, a rubber, an elastomer or the like, is configured to improve grip performance with respect to the floor surface.

Each motor 35 (FIG. 1) which is disposed, for example, in correspondence with each driving wheel 34 is enabled to drive each driving wheel 34 independently.

The swing wheel 36 which is positioned at a generally central portion in the widthwise direction of the lower surface portion of the main casing 20 and its front portion is a driven wheel turnable along the floor surface.

Figure 1:
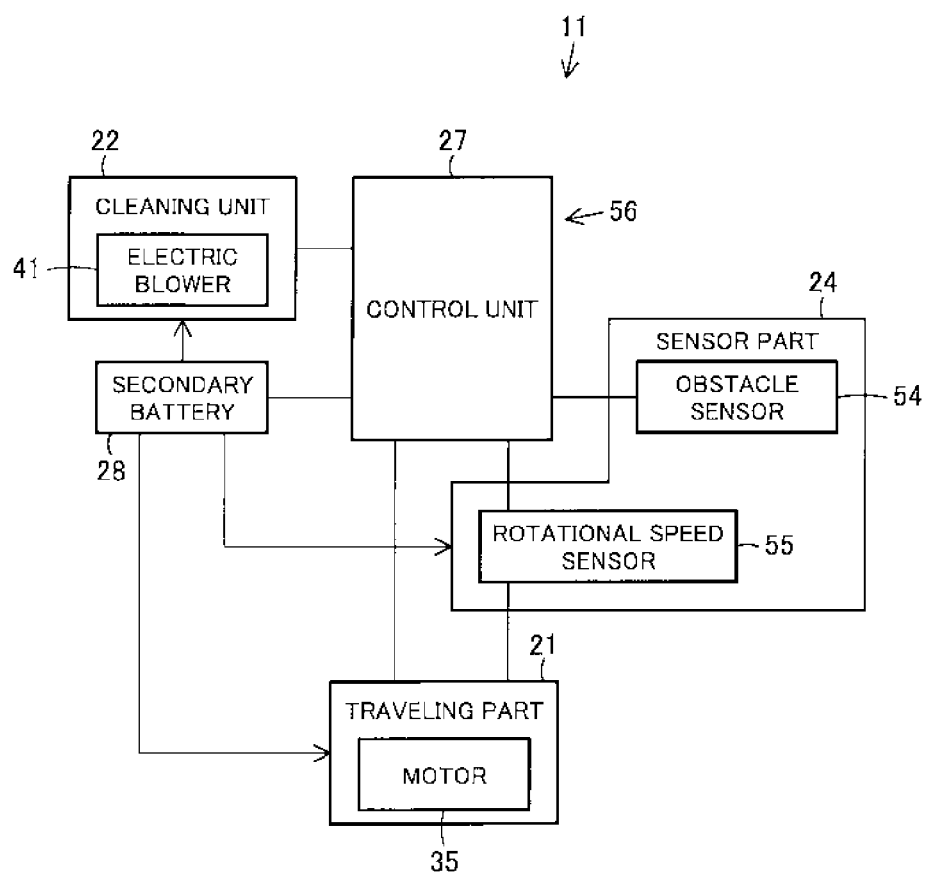
FIG. 1 is a block diagram showing an internal configuration of an autonomous traveler according to a first embodiment.

The cleaning unit 22 shown in FIG. 1 includes, for example, an electric blower 41 which is positioned inside the main casing 20 (FIG. 2A) to suck dust and dirt along with air through the suction port 31 (FIG. 2B) and discharge exhaust air through the exhaust port. The cleaning unit 22 may include, for example, a rotary brush as a rotary cleaner which is rotatably attached to the suction port 31 to scrape up dust and dirt, a side brush which is auxiliary cleaning means (an auxiliary cleaning part) as a swinging cleaning part rotatably attached on both sides of the main casing 20 (FIG. 2A) on its front side or the like to scrape together dust and dirt, or the like.

The sensor part 24 may include, for example, an obstacle sensor 54 as object detection means (an object detection part) for detecting an object in the periphery of the main casing 20 (FIG. 2A). The sensor part 24 may also include a rotational speed sensor 55 such as an optical encoder as rotational speed detection means (a rotational speed detection part) for detecting rotational speed of each driving wheel 34 (each motor 35). The sensor part 24 may also include, for example, step gap detection means for detecting a step gap on a floor surface, dust-and-dirt amount detection means for detecting an amount of dust and dirt on a floor surface, or the like.

The obstacle sensor 54 is to detect whether or not any obstacle exists in the periphery of the main casing 20. Non-contact detection means, for example, an infrared sensor, an ultrasonic sensor or the like, contact detection means which detects an object by contacting, or the like serves as the obstacle sensor 54.

The rotational speed sensor 55 is designed to detect a turning angle or a progressional distance of the vacuum cleaner 11 (main casing 20 (FIG. 2A)) based on the measured rotational speed of the driving wheels 34 (FIG. 2B) or the motors 35. Accordingly, the rotational speed sensor 55 is a position detection sensor for detecting a relative position of the vacuum cleaner 11 (main casing 20 (FIG. 2A)) against a reference position of a charging device, for example.

The control means 27 is a microcomputer including, for example, a CPU which is a control means main body (control unit main body), a ROM which is a storage part in which fixed data such as programs to be read by the CPU are stored, a RAM which is an area storage part for dynamically forming various memory areas such as a work area serving as a working region for data processing by programs or the like (where these component members are not shown). Then, the control means 27 has, for example, a traveling mode for driving each driving wheel 34 (FIG. 2B), that is, each motor 35 to make the vacuum cleaner 11 (main casing 20 (FIG. 2A)) autonomously travel. The control means 27 may also have a charging mode for charging the secondary battery 28 via the charging device. The control means 27 may further have a standby mode applied during a standby state. In addition, the control means 27 detects, in the traveling mode, that the driving wheels 34 (motors 35) are in an idling state when a going-straight distance by the vacuum cleaner 11 (main casing 20) detected by the rotational speed sensor 55 is equal to or longer than a specified distance. Accordingly, detection means (an idling detection part) 56 for detecting that the driving wheels 34 are in an idling state is configured with the rotational speed sensor 55 and the control means 27. Furthermore, the above-described specified distance for determination of being in the idling state may be a fixed distance which is previously set, for example, 10 meters, or can be automatically set, based on a traveling history in the area, to a larger value than the longest going-straight distance in the history.

In addition, the secondary battery 28 is electrically connected to charging terminals serving as a connecting part not shown in figures. With the charging terminals electrically and mechanically connected to the charging device side, the secondary battery 28 is designed to be charged via the charging device.

Next, the operation of the above-described first embodiment will be described.

In general, the work of a vacuum cleaning apparatus is roughly divided into traveling work for autonomous traveling by the vacuum cleaner 11, cleaning work for carrying out cleaning by the vacuum cleaner 11 in the embodiment, and charging work for charging the secondary battery 28 by the charging device. The charging work is implemented by a known method using a charging circuit contained in the charging device. Accordingly, only the cleaning work will be described.

In the vacuum cleaner 11, as for the general cleaning work, for example at a timing such as of arrival of a preset cleaning start time or reception of a cleaning-start instruction signal transmitted by a remote control or the external device, the control means 27 is switched over from the standby mode to the traveling mode, and the control means 27 drives each motor 35 (each driving wheel 34) to undock the vacuum cleaner 11 from the charging device.

Then, the vacuum cleaner 11 detects an obstacle in the periphery of the main casing 20 by use of the obstacle sensor 54, and implements cleaning by use of the cleaning unit 22 while traveling under avoidance of the detected obstacle. Specifically, the vacuum cleaner 11 travels in a whole area while repeating going straight, and moving back and directional change for avoidance of the obstacle. At the going straight or moving back, the control means 27 rotates each motor 35 (each driving wheel 34) in the same direction (an advancing direction or a moving-back direction) at the same rotational speed (the same speed). On the other hand, at the directional change, the control means 27 rotates each motor 35 (each driving wheel 34) respectively at a different rotational speed (different speed) and/or in a different rotational direction. In the embodiment, at the directional change, each motor 35 (each driving wheel 34) are rotated at mutually opposite directions at the same rotational speed (same speed) so that the vacuum cleaner 11 (main casing 20) is controlled to turn (perform spin turn) at the position.

As for the cleaning unit 22, dust and dirt on the floor surface are collected to a dust collecting unit 33 via the suction port 31 by the electric blower 41 driven by the control means 27. Then, in the case where the cleaning is finished or in a specified condition such as where the capacity of the secondary battery 28 decreases to a specified level during the cleaning work, which is insufficient for completion of the cleaning or image pickup (where the voltage of the secondary battery 28 has decreased to around a discharge termination voltage), the control means 27 of the vacuum cleaner 11 controls the operation of each motor 35 (each driving wheel 34) to return to the charging device.

In this case, the detection means 56 detects that the driving wheels 34 are in an idling state. That is, at traveling in a normal area, the vacuum cleaner 11 detects an obstacle by use of the sensor part 24 after going straight by some distance, and implements a directional change to avoid the obstacle. Accordingly, in the case where upon the detection by the rotational speed sensor 55 the control means 27 determines that the vacuum cleaner 11 (main casing 20) has traveled straight by a specified distance or longer without implementing a directional change, the detection means 56 determines that the driving wheels 34 are in an idling state because the vacuum cleaner 11 gets stuck or with other reason.

Upon the detection of the idling state, the control means 27 controls the operation of the motors 35 (driving wheels 34) so as to implement an idling avoidance operation.

Specifically, the control means 27 first makes the vacuum cleaner 11 (main casing 20) retreat by a certain distance. That is, the control means 27 rotates each motor 35 (each driving wheel 34) in a moving back direction at the same rotational speed (same speed). In general, such a case where the driving wheels 34 are in an idling state due to getting stuck of the vacuum cleaner 11 or other reason is considered to be caused by being caught at or riding over a step gap or the like when the vacuum cleaner 11 (main casing 20) goes straight. Accordingly, since resolution of the idling state is considered difficult when the vacuum cleaner 11 (main casing 20) is simply made to advance as is, the vacuum cleaner 11 (main casing 20) is first made to retreat, thereby increasing the possibility of resolution from the state of being caught or riding over.

Then, the control means 27 implements consecutively for a plurality of times, for example, twice, the operation to make the vacuum cleaner 11 (main casing 20) turn in a specified one direction and then advance by a specified distance. That is, the control means 27 implements consecutively for a plurality of times (twice) the operation to make the vacuum cleaner 11 (main casing 20) turn by a specified angle (45° or more, for example 60°) in one direction against the advancing direction by rotating either one of the motors 35 (driving wheels 34) in the advancing direction and the other in the moving back direction respectively at the same rotational speed (same speed) to change the advancing direction, and then to make the vacuum cleaner 11 (main casing 20) advance by a specified distance (10 meters, for example) by rotating each motor 35 (each driving wheel 34) respectively in the advancing direction at the same rotational speed (same speed).

Figure 3A:
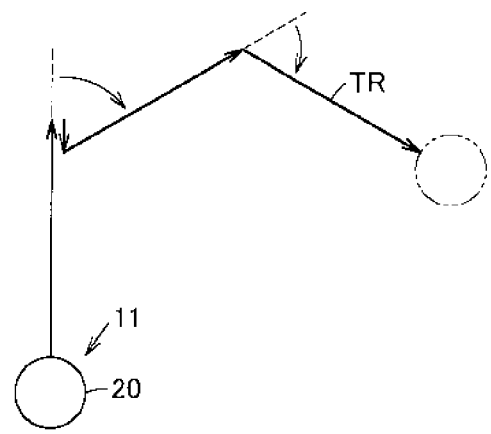
FIG. 3A is an explanatory view showing an example of an idling avoidance operation of the above autonomous traveler.
Figure 3B:
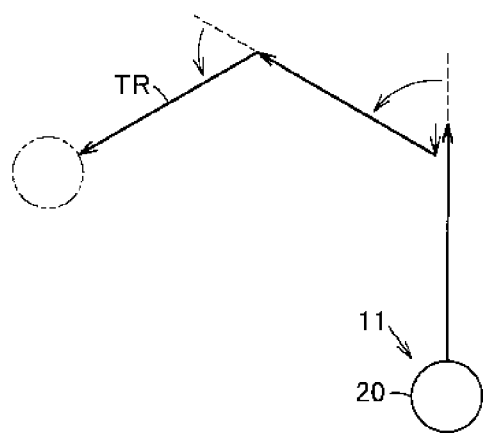
FIG. 3B is an explanatory view showing another example of the idling avoidance operation of the above autonomous traveler.
Figure 4A:
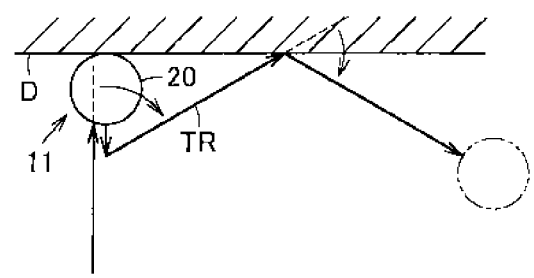
FIG. 4A is an explanatory view showing an example of a situation where the idling avoidance operation of the above autonomous traveler makes a driving part escape from an idling state.
Figure 4B:
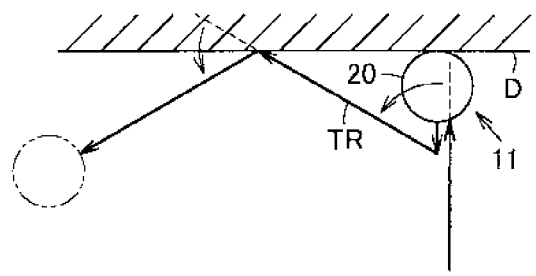
FIG. 4B is an explanatory view showing another example of the situation where the idling avoidance operation of the above autonomous traveler makes the driving part escape from the idling state.

Each of FIG. 3A and FIG. 3B shows a traveling path TR of the vacuum cleaner 11 (main casing 20) based on the operation. FIG. 3A shows an example in which the vacuum cleaner 11 (main casing 20) is made to turn right, while FIG. 3B shows an example in which the vacuum cleaner 11 (main casing 20) is made to turn left. In these examples shown in FIG. 3A and FIG. 3B, the vacuum cleaner 11 (main casing 20) travels as is actually without getting stuck. However, as shown in FIG. 4A or FIG. 4B, in the case where the vacuum cleaner 11 gets stuck at a step gap D or the like and the driving wheels 34 are in the idling state, the above-described travel control makes the vacuum cleaner 11 first reach the step gap D at right 60° or at left 60° against the step gap D, and then travel in a direction away (in a direction departing by 30°) from the step gap D (on the traveling path TR shown in FIGS. 4A and 4B), thereby increasing the possibility of escaping from the idling state at the step gap D. The vacuum cleaner 11 may be capable of implementing at least one of these travel controls. Alternatively, the vacuum cleaner 11 which is capable of implementing the both travel controls may select one as necessary. In addition, as for the angle for making the vacuum cleaner 11 (main casing 20) turn, the same angle may be used consecutively for a plurality of times, or a different angle at least once may be used. Furthermore, when the vacuum cleaner 11 (main casing 20) is made to turn at the second and subsequent times, the vacuum cleaner 11 (main casing 20) may be made to first move back and then turn.

The control means 27 stops the driving of the motors 35 (driving wheels 34) in the case where the detection means 56 detects that the driving wheels 34 is in the idling state even after the above-described idling avoidance operation is implemented. At the stopping, reporting to a user may be implemented, for example, with a lamp, by sound, by an e-mail transmitted to an external device owned by a user or other method to make a user recognize that the driving wheels 34 are in the idling state in an area and to prompt the user to improve the floor surface to a state in which the vacuum cleaner 11 can easily travel.

As described above, according to the above-described first embodiment, in the case where the detection means 56 detects that the driving wheels 34 are in the idling state, the operation of the driving wheels 34 is controlled so as to, after the operation to make the main casing 20 (vacuum cleaner 11) retreat by a certain distance, implement consecutively for a plurality of times the operation to make the main casing 20 (vacuum cleaner 11) turn in a specified one direction and advance by a specified distance. This can largely change the direction in which the vacuum cleaner 11 (main casing 20) reaches an obstacle such as a step gap on the floor surface, thus effectively enabling the driving wheels 34 to escape from the idling state.

That is, the repetition for a plurality of times of turning in the same direction and going straight provides an easier directional change so as to make the vacuum cleaner 11 (main casing 20) go straight in a direction finally away from an obstacle such as a step gap on a floor surface (in a direction having a direction component to be opposite to the direction toward the obstacle), compared to the case of alternate repetition of turning in one direction and turning in other direction, and further can prevent the condition in which the driving wheels 34 become in the idling state due to going straight again to the obstacle.

In addition, in the case where after the idling avoidance operation the detection means 56 detects that the driving wheels 34 are in the idling state, stopping of the operation of the driving wheels 34 can prevent the driving wheels 34 from being unnecessarily kept in the idling state and/or the waste of the secondary battery 28.

Next, the second embodiment will be described with reference to FIGS. 5A and 5B. As for the same configuration and operation as the above-described first embodiment, the same reference number is imparted and its description is omitted.

In the second embodiment, as the idling avoidance operation of the above-described first embodiment, the control means 27 controls the operation of the driving wheels 34 (motors 35) so as to, after the operation to make the vacuum cleaner 11 (main casing 20) retreat by a certain distance, alternately implement a first operation in which an operation to make the vacuum cleaner 11 (main casing 20) turn in a specified one direction and advance by a specified distance is repeated consecutively for a plurality of times, and a second operation in which an operation to make the vacuum cleaner 11 (main casing 20) turn in other direction that is the direction opposite to the one direction and advance by a specified distance is repeated consecutively for a plurality of times.

Specifically, in the embodiment, the same as the above-described first embodiment, in the first operation the control means 27 repeats, for example, twice the operation of turning in one direction and going straight by a specified distance, after making the vacuum cleaner 11 (main casing 20) retreat by a specified distance. Then, in the second operation the control means 27 repeats, for example, twice the operation to make the vacuum cleaner 11 (main casing 20) turn in other direction and go straight by a specified distance. The same as the above-described first embodiment, as for the angle for making the vacuum cleaner 11 (main casing 20) turn in the first operation or the second operation, the same angle may be used consecutively for a plurality of times, or a different angle at least once may be used. In addition, the turning angle in the first operation and the turning angle in the second operation may be the same or may be different from each other.

Figure 5A:
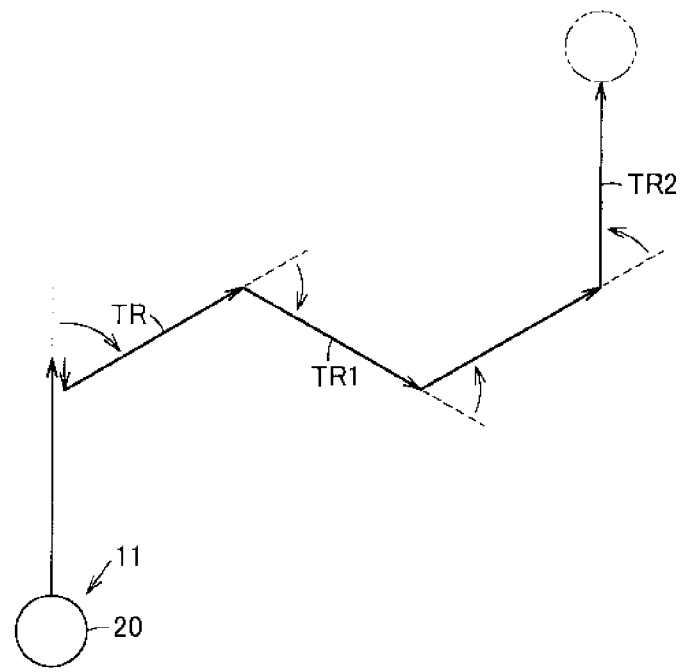
FIG. 5A is an explanatory view showing an example of an idling avoidance operation of an autonomous traveler according to a second embodiment.
Figure 5B:
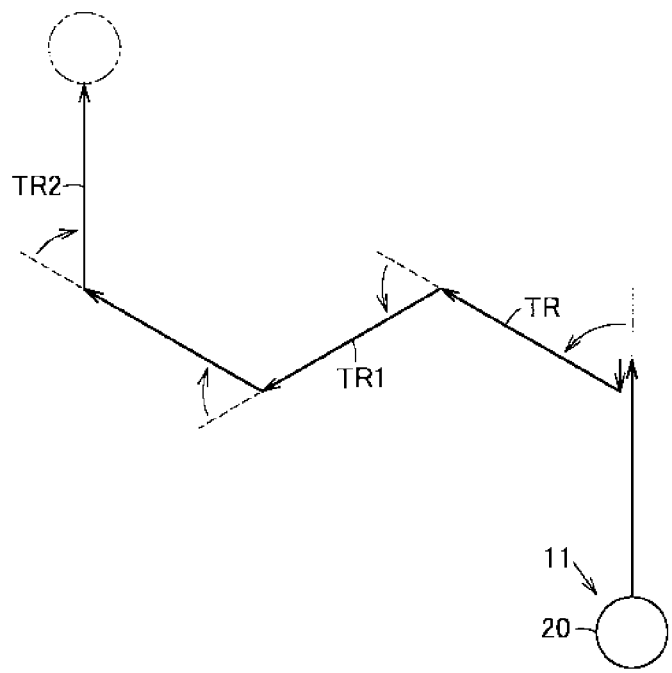
FIG. 5B is an explanatory view showing another example of the idling avoidance operation of the above autonomous traveler.
Figure 6A:
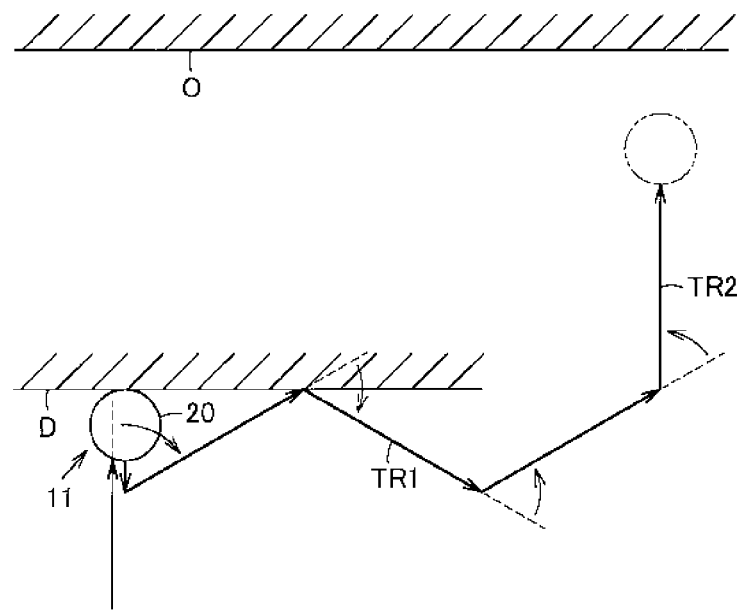
FIG. 6A is an explanatory view showing an example of a situation where an idling avoidance operation of the above autonomous traveler makes a driving part escape from an idling state.
Figure 6B:
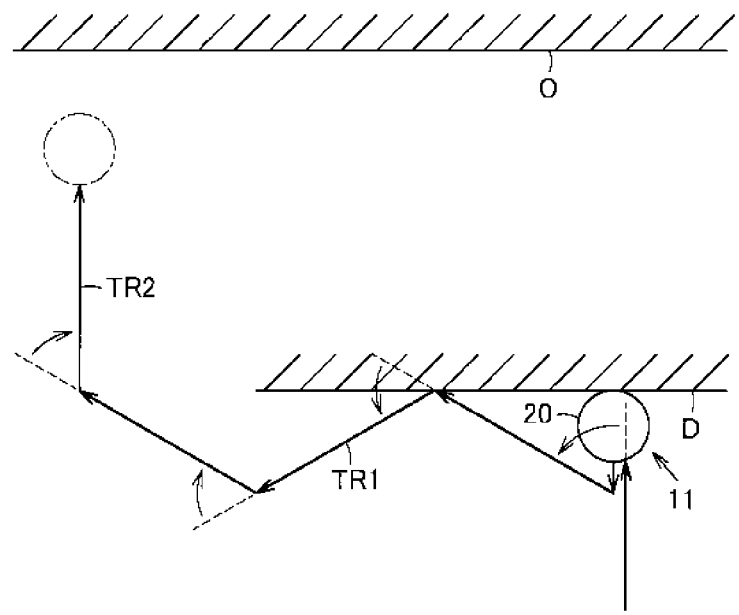
FIG. 6B is an explanatory view showing another example of the situation where the idling avoidance operation of the above autonomous traveler makes the driving part escape from the idling state.

Each of FIG. 5A and FIG. 5B shows the traveling path TR of the vacuum cleaner 11 (main casing 20) based on the operation. FIG. 5A shows an example in which the vacuum cleaner 11 (main casing 20) is made to first turn right side consecutively twice (a traveling path TR1) and then turn left side consecutively twice (a traveling path TR2), while FIG. 5B shows an example in which the vacuum cleaner 11 (main casing 20) is made to first turn left side consecutively twice (a traveling path TR1) and then turn right side consecutively twice (a traveling path TR2). Also in these examples shown in FIG. 5A and FIG. 5B, the vacuum cleaner 11 (main casing 20) travels as is actually without getting stuck. However, as shown in FIG. 6A or FIG. 6B, in the case where the vacuum cleaner 11 gets stuck at the step gap (obstacle) D and the driving wheels 34 are in the idling state, the travel control as described above makes the vacuum cleaner 11 escape from the idling state at the step gap D the same as the above-described first embodiment, and further travel to avoid the step gap D, from a position in the periphery of the step gap D, in other words, from a position closer to an obstacle O such as a wall than the position at the traveling start, toward the same direction as the advancing direction before the idling state is first detected. As a result, if the vacuum cleaner 11 has escaped from the idling state, the sensor part 24 easily detects the obstacle O after the vacuum cleaner 11 goes straight by some distance. If the vacuum cleaner 11 has not escaped from the idling state, the sensor part 24 does not detect the obstacle. Accordingly, whether or not the vacuum cleaner 11 has escaped from the idling state can be determined more easily.

Next, the third embodiment will be described with reference to FIGS. 7A and 7B. As for the same configuration and operation as the above-described first embodiment, the same reference number is imparted and its description is omitted.

In the third embodiment, the control means 27 controls the operation of the driving wheels 34 (motors 35), in the idling avoidance operation of the above-described second embodiment, so as to in the first operation, make the vacuum cleaner 11 (main casing 20) turn in one direction and advance by a distance which is equal to or less than the distance by which the vacuum cleaner 11 (main casing 20) is immediately previously made to advance after turning in one direction, and so as to in the second operation, make the vacuum cleaner 11 (main casing 20) turn in other direction and advance by the distance which is longer than the distance by which the vacuum cleaner 11 (main casing 20) is immediately previously made to advance after turning in other direction.

That is, in the first operation, the control means 27 controls the operation of the driving wheels 34 (motors 35) so as to shorten a distance for going straight each time the turning and going straight is repeatedly implemented, in other words, so that when making the vacuum cleaner 11 (main casing 20) turn and go straight, for example, consecutively M times (M is a natural number not less than 2, in the embodiment, M is 2), the distance for going straight after the m-times (m is a natural number satisfying $2 \leq m \leq M$) turning is equal to or less than the distance for going straight after the (m−1)-times turning.

Further, in the second operation, the control means 27 controls the operation of the driving wheels 34 (motors 35) so as to lengthen a distance for going straight each time the turning and going straight is repeatedly implemented, that is, so that when making the vacuum cleaner 11 (main casing 20) turn and go straight, for example, consecutively N times (N is a natural number not less than 2, in the embodiment, N is 2), the distance for going straight after the n-times (n is a natural number satisfying $2 \leq n \leq N$) turning is longer than the distance for going straight after the (n−1)-times turning.

Figure 7A:
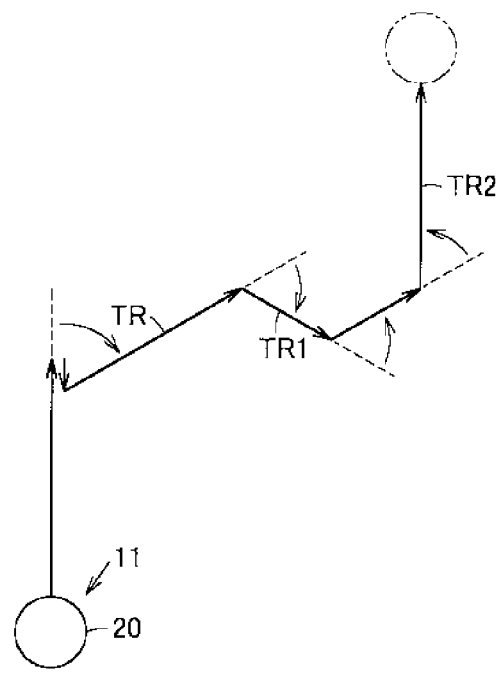
FIG. 7A is an explanatory view showing an example of an idling avoidance operation of an autonomous traveler according to a third embodiment.
Figure 7B:
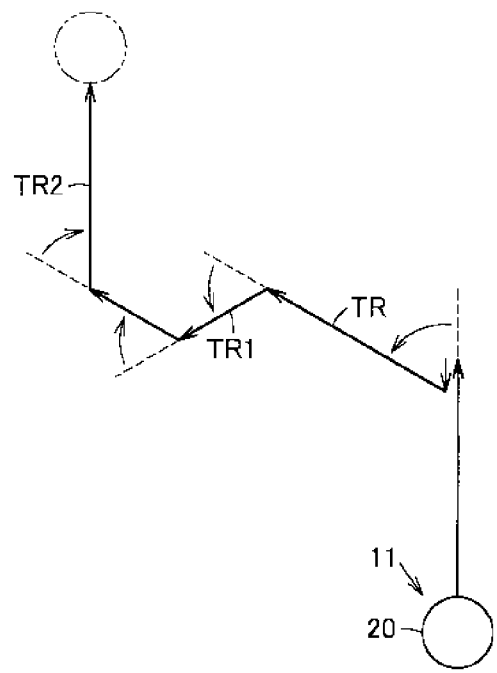
FIG. 7B is an explanatory view showing another example of the idling avoidance operation of the above autonomous traveler.

Each of FIG. 7A and FIG. 7B shows the traveling path TR of the vacuum cleaner 11 (main casing 20) based on the operation. FIG. 7A shows an example in which the vacuum cleaner 11 (main casing 20) is made to first turn right side consecutively twice (traveling path TR1), and then turn left side consecutively twice (traveling path TR2), while FIG. 7B shows an example in which the vacuum cleaner 11 (main casing 20) is made to first turn left side consecutively twice (traveling path TR1), and then turn right side consecutively twice (traveling path TR2).

As a result, if the vacuum cleaner 11 cannot escape from the idling state even when the idling avoidance operation is implemented, the driving wheels 34 can be prevented from keeping idling at the same position longer than a necessary period of time. Accordingly, a problem hardly occurs, for example, color migration to the floor surface caused by friction between the floor surface and a soft member of the outer circumferential part of the driving wheels 34.

In the above-described second and third embodiments, the number of repetition times of turning and going straight in the first operation and the number of repetition times of turning and going straight in the second operation are the same (twice for both). However, these numbers (M and N) of times may be different from each other.

In addition, in the above-described embodiments, the autonomous traveler is the vacuum cleaner 11. However, an autonomous traveler without a cleaning function such as the cleaning unit 22 may be designed.

At least one of the above-described embodiments allows the driving wheels 34 to escape from the idling state effectively, and allows the vacuum cleaner 11 (main casing 20) to autonomous travel while less getting stuck or the like on various types of floor surfaces. Accordingly, cleaning in a more complicated area is achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The invention claimed is:

1. An autonomous traveler, comprising:
a main casing;
a driving part, including a motor and at least one wheel, for enabling the main casing to travel;
circuitry configured to
control a driving of the driving part to make the main casing autonomously travel; and
detect that the driving part is in an idling state, wherein directly in response to a single detection of the idling state, the circuitry is further configured to control an operation of the driving part to, after making the main casing retreat by a certain distance, repeat consecutively, for a plurality of times, a particular operation to make the main casing turn in a specified first direction and advance by a specified first distance.

2. The autonomous traveler according to claim 1, wherein the circuitry is further configured to stop the operation of the driving part when detecting that the driving part is in the idling state after controlling the operation of the driving part.

3. The autonomous traveler according to claim 1, wherein when the circuitry detects that the driving pan is in the idling state, the circuitry is further configured to control the operation of the driving part to, after making the main casing retreat by the certain distance, alternately implement a first operation to make the main casing turn in the specified first direction and advance by the specified first distance repeatedly and consecutively for a first plurality of times, and a second operation to make the main casing turn in another direction that is a direction opposite to the specified first direction and advance by a specified second distance repeatedly and consecutively for a second plurality of times.

4. The autonomous traveler according to claim 3, wherein the circuitry is further configured to control the operation of the driving part to,
in the first operation, make the main casing turn in the specified first direction and advance by a first particular distance, which is equal to or less than the specified first distance by which the main casing is immediately previously made to advance after previously turning in the specified first direction, and
in the second operation, make the main casing turn in the other direction and advance by a second particular distance, which is longer than the specified second distance by which the main casing is immediately previously made to advance after previously turning in the other direction.

5. The autonomous traveler of claim 1, wherein the circuitry is further configured to control the driving part to repeat the particular operation of turning and advancing the plurality of times, without making the main casing retreat between performance of each particular operation of turning and advancing, directly in response to only the single detection of the idling state.

6. A control method for an autonomous traveler, comprising:
directly in response to a single detection that a driving part is in an idling state, after retreating by a certain distance, repeating consecutively, for a plurality of times, a particular operation of turning in a specified first direction and advancing by a specified first distance.

7. The control method for the autonomous traveler according to claim 6, further comprising stopping an operation of the driving part upon detecting that the driving part is in the idling state.

8. The control method for the autonomous traveler according to claim 6, further comprising, upon detecting that the driving part is in the idling state, after retreating by the certain distance, alternately implementing a first operation of turning in the specified first direction and advancing by the specified first distance repeatedly and consecutively for a first plurality of times, and a second operation of turning in another direction that is a direction opposite to the specified first direction and advancing by a specified second distance repeatedly and consecutively for a second plurality of times.

9. The control method for the autonomous traveler according to claim 8,
wherein, in the first operation, a first particular distance for advancing after turning in the specified first direction is equal to or less than the specified first distance for immediately previously advancing after previously turning in the specified first direction, and wherein, in the second operation, a second particular distance for advancing after turning in the other direction is longer than the specified second distance for immediately previously advancing after previously turning in the other direction.

10. An autonomous traveler, comprising:

a main casing;

a driving part, including a motor and at least one wheel, for enabling the main casing to travel;

circuitry configured to control a driving of the driving part to make the main casing autonomously travel; and detect that the driving part is in an idling state, wherein directly in response to a single detection of the idling state, the circuitry is further configured to control an operation of the driving part to consecutively perform, in order: making the main casing retreat by a certain distance, making the main casing turn in a specified first direction, making the main casing advance by a specified first distance, making the main casing turn in the specified first direction, and making the main casing advance by the specified first distance.

* * * * *